United States Patent [19]

Brown et al.

[11] 4,224,382

[45] Sep. 23, 1980

[54] HARD FACING OF METAL SUBSTRATES

[75] Inventors: Harry J. Brown, Lewiston; Kuldip S. Chopra, Grand Island, both of N.Y.

[73] Assignee: Union Carbide Corporation, New York, N.Y.

[21] Appl. No.: 6,785

[22] Filed: Jan. 26, 1979

[51] Int. Cl.² ............................ B23K 35/32; C23C 13/00
[52] U.S. Cl. ................................ 428/656; 219/76.1; 219/76.14; 427/190; 427/191
[58] Field of Search ............... 219/76.1, 76.14, 146.51; 427/190, 191, 205, 305, 319, 225; 75/242, 236, 237; 428/457, 656, 662, 664, 667

[56] References Cited

U.S. PATENT DOCUMENTS

| | | | |
|---|---|---|---|
| 1,973,428 | 9/1934 | Comstock | 75/242 |
| 1,977,361 | 10/1934 | Taylor | 75/237 |
| 2,002,198 | 5/1935 | Wissler | 427/225 |
| 2,133,867 | 10/1938 | Lucas | 75/242 |
| 2,253,969 | 8/1941 | Dawihl | 75/242 X |
| 2,349,052 | 5/1944 | Ollier | 75/236 |
| 2,507,195 | 5/1950 | Cobeck | 75/236 |
| 2,607,676 | 8/1952 | Kurtz | 75/236 |
| 3,004,873 | 10/1961 | Strohmeier | 75/236 X |
| 3,023,130 | 2/1962 | Wasserman | 428/367 X |
| 3,071,489 | 1/1963 | Pelton | 427/190 X |
| 3,165,822 | 1/1965 | Beeghly | 75/242 X |
| 3,539,307 | 11/1970 | Baumel | 75/237 |
| 3,790,353 | 2/1974 | Jackson | 75/236 |
| 3,800,891 | 4/1974 | White | 175/374 |
| 3,823,030 | 7/1974 | Hudson | 219/76.14 X |
| 3,859,057 | 1/1975 | Stoll | 75/242 |
| 3,876,447 | 4/1975 | Lally | 427/190 X |
| 4,055,742 | 10/1977 | Brown | 219/146.51 |
| 4,075,376 | 2/1978 | Jaeger | 427/190 X |
| 4,162,392 | 7/1979 | Brown | 219/146.51 |

FOREIGN PATENT DOCUMENTS

| | | | |
|---|---|---|---|
| 696978 | 11/1964 | Canada | 427/190 |
| 2033899 | 1/1971 | Fed. Rep. of Germany | 427/191 |
| 950767 | 2/1964 | United Kingdom | 427/190 |

*Primary Examiner*—Richard R. Kucia
*Attorney, Agent, or Firm*—John R. Doherty

[57] ABSTRACT

Method for hard-facing metal substrates is disclosed using a hard facing material consisting essentially of combined vanadium, tungsten and carbon and from about 5 to about 40% by weight of chromium carbide with up to 15% by weight in the aggregate of cobalt, iron, molybdenum and nickel.

3 Claims, 1 Drawing Figure

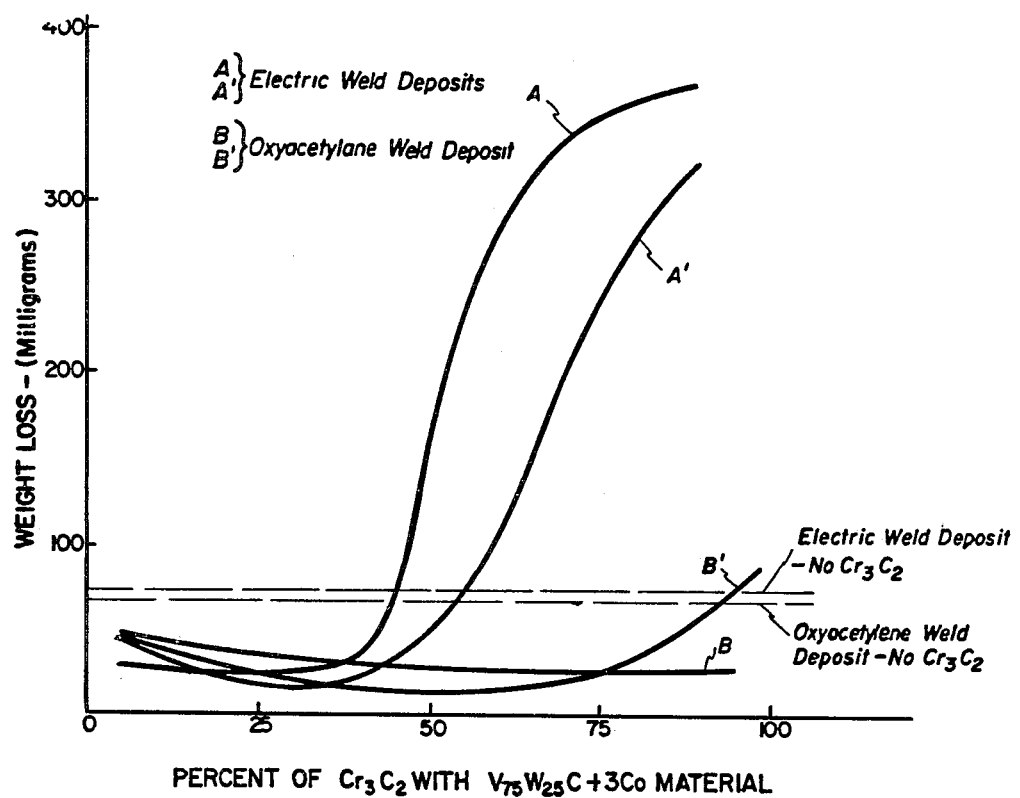

HARD FACING OF METAL SUBSTRATES

The present invention relates to the hard facing of iron base alloy substrates. More particularly, the present invention relates to the hard facing of iron based alloy substrates using as the hard-facing material a vanadium, tungsten, chromium and carbon containing composition to provide improved wear and impact resistance.

Hard facing of substrates, e.g. metal surfaces*, is a common industrial practice, for example, cast particulate tungsten carbide ($W_2C$-WC) or cobalt bonded WC, usually encased in a steel tube, is deposited by hard facing techniques on iron base alloys in making wear resistant cutters, earth moving equipment and the like. It has been found, however, that due possibly to the inherently different physical properties of base metal and tungsten carbide, the hard facing material has a tendency to become unevenly distributed in the molten portion of the metal substrate and as a result, undesired variations in hardness can occur in the resulting solidified hard-faced surfaces.

*The Oxy-Acetylene Handbook, 11th Edition, Linde Air Products Division of Union Carbide Corporation, also Welding Handbook Third Edition, American Welding Society.

Also, during the deposition of both cast and cobalt-bonded tungsten carbide on iron and steel substrates, the molten iron in the substrate dissolves some of the tungsten carbide and upon cooling results in the precipitation of the mixed carbides $(FeW)_6C$ and $Fe_3W_3C$ according to the formula $3WC+9 FE \rightarrow Fe_3W_3C + 2Fe_3C$, thus resulting in substantial depletion of the deposited tungsten into less wear resistant phase.

In instances where tungsten carbide is employed in hard facing, due to the high density of tungsten carbide, a relatively large weight of tungsten carbide is required for adequate hard facing.

It is accordingly an object of the present invention to provide a hard-facing method using a material containing vanadium and chromium carbide in combination with tungsten and carbon to produce a hard-faced surface having wear resistant properties at least comparable to those provided by the use of conventional tungsten carbide.

Other objects will be apparent from the following description and claims taken in conjunction with the drawing which shows a graph of test data obtained in accordance with the practice of the present invention.

The Figure of the drawing shows graphically wear and abrasio results of hard facing deposits obtained using chromium carbide containing hard facing material in accordance with the present invention; the Figure also shows wear and abrasion results f for hard facing material not containing chromium carbide.

The present invention is directed to an improvement in conventional methods of hard-facing substrates which comprises employing as the hard facing material a solid material consisting essentially of chemically combined vanadium, tungsten, and carbon weight proportions of 0.76VC, 0.25WC and from about 5 to about 40% by weight of chromium carbide in proportions of $Cr_3C_2$, from 0 to 100% of said chromium carbide being chemically combined with said 0.75VC, 0.25WC in the form of a vanadium, tungsten, chromium carbide having the empirical formula:

$$[A\ Cr_{1.5} \cdot B\ 0.75V,\ 0.25W]C$$

where $A = 0.05$ to $0.4$ $B = 0.6$ to $0.95$ $A + B = 1.0$

The aforedescribed composition can also contain up to 15% by weight in the aggregate of cobalt, iron, nickel and molybdenum, preferably 3 to 6% cobalt.

While various techniques can be used for producing the above described hard facing material from conventional starting materials, including elemental vanadium, tungsten, chromium and carbon, the preferred form of the hard facing material for use in the method of the present invention is a particulated cold pressed and sintered, e.g. under hydrogen atmosphere or vacuum, and subsequently granulated material illustrated by example in the present specification. In these examples, the starting vanadium, tungsten, chromium and carbon materials are blended, compacted and sintered under a hydrogen atmosphere at elevated temperatures, e.g. about 1200°–1600° C. and for periods, e.g. ½ to 3 hours, sufficient to produce material as aforedescribed.

A particular embodiment of the present invention comprises a hard facing rod in conventional form for use in hard facing iron and iron base alloy metal substrates, e.g. mild steel, Hadfield steels and the like. Such a hard facing rod comprises a metallic sheath or tube formed of the usual metals for such purposes such as iron, steel, aluminum, copper and the like containing therein a hard facing composition as previously described.

The hard facing method of the present invention can be used with known gas and electric welding techniques, e.g. gas welding, arc welding and other practices described in the "Master Chart of Welding Processes"—American Welding Society (1969), using conventional fluxes.

The hard facing method of the present invention can also be used with known plasma flame spraying or coating techniques ("Flame Spray Handbook" Volume III-–METCO INC. (1965).

In the hard facing of metal substrates in accordance with the present invention by the above-noted conventional techniques the metal substrate and the applied hard facing material become metallurgically bonded.

The following examples illustrate materials for use as hard-facing compositions in accordance with the present invention:

EXAMPLE I

The following materials were used to obtain a cold pressed, sintered hard-facing composition containing 90% by weight of 0.75VC, 0.25WC+3%Co material and 10% by weight of $Cr_3C_2$ for use in the present invention:

(a) 3111.8 g of a commercially available material (Union Carbide Corporation) containing mixed $V_2C$+VC, sized 65 mesh and finer having the following analysis:

84.69% V
13.20% C
1.10% O

Balance moisture and incidental impurities.

(b) 244.5 Acheson* brand G39 graphite powder, sized 200 mesh and finer.

(c) 135 g cobalt powder, extra fine grade from African Metals Corp.

(d) 1024.3 g of UCAR* tungsten metal powder (2 micron).

(e) 500 g of chromium carbide ($Cr_3C_2$) sized 325 mesh and finer. The $Cr_3C_2$ had the following analysis:
86.67% Cr
12.60% C
0.04% O
0.29% Fe

*Trademark of Union Carbide Corporation

The powders were placed in a one cubic foot ball mill with 75 lbs. of ½-in. dia. balls and turned at 57 RPM for 18 hours. After 18 hours milling, the material was pressed into pellets in a 2 inch diameter die at a fifty ton load. The pellets were crushed into granules. The granules were placed in graphite boats and sintered in a pure hydrogen push-through molybdenum-wound heat-treating furnace. The sintering cycle was as follows: The graphite boat was placed inside the furnace door for ¼ hour, to diffuse out residual atmospheric gases. The boat then was advanced to a 900°–1200° C. zone to allow the reduction of any residual oxides and the removal of the reduction products. The the boat was advanced into the hot zone at 1500° C. for 1½ hr. to provide sintering of the cold pressed material. The boat was then pushed out of the hot zone into a water-cooled chamber and brought to room temperature in about 15 minutes. The granules were lightly bonded together but were easily separated in a jaw crusher. Aside from the contained cobalt and $Cr_3C_2$ the material was formed of chemically combined vanadium, tungsten and carbon, 0.75VC, 0.25WC and had the following analysis by weight:

| | |
|---|---|
| V | 51.19% |
| W | 20.80% |
| Cr | 8.46% |
| Fe | 1.60% |
| Co | 3.75% |
| C | 13.58% |
| D | 0.34% |
| N | 0.14% |

The cold pressed and sintered material was prepared in the foregoing example and using various amounts of $Cr_3C_2$, was employed as a hard facing material in the following manner.

For electric welding deposits 10×30 mesh granules were packed into 12 in. long 0.250 in. O.D., 0.190 in. I.D. mild steel tubing. The granules comprised about 45% by weight of the rod. The rod was fluxed for electric deposition and deposited on an iron substrate at 180 amp D.C.R.P.; for gas welding deposits 65×150 mesh granules were similarly packed into mild steel tubing and fluxed for oxyacetylene welding and deposited by oxyacetylene techniques with a minimum of penetration on a mild steel substrate with a carburizing flame.

The resulting hard-faced surfaces were tested for abrasion resistance using a rubber wheel-sand wear and abrasion test. The wear and abrasion test was as follows: A 1 inch × 3 inch × ½ inch thick steel substrate is hard faced by depositing a hard faced material thereon and the hard faced surface is ground flat. A 9 ⅛ inch O.D. by ½ inch wide neoprene circular disk (durometry hardness shore A 50–60) is used with the hard faced surface being loaded with 38 ft.-lbs. of force against the neoprene disk. Silica sand (sand blast sand size 2, QROK) is fed in excess between the neoprene disk and the and the hard faced surface with the neoprene disk being turned at 200 RPM for 200 revolutions. The specimen under test is weighed before and after and the procedure is repeated until a constant weight loss is obtained for repeated tests and this weight loss is used as a measure of wear and abrasion resistance. The results obtained are shown in the graph of the drawing and compared with the results obtained without chromium carbide additions. In the drawing, A and B are the results obtained using a sintered mixture of 0.75WV, 0.25WC+3Co and $Cr_3C_2$; A' and B' are the results obtained using a mechanical mixture of 0.75VC, 0.25WC+3Co with chromium carbide, $Cr_3C_2$.

EXAMPLE II

The following materials were used to obtain a cold pressed, sintered hard-facing composition containing 70% by weight of 0.75VC, 0.25WC+3%Co material and 30% by weight of chromium carbide in proportions of $Cr_3C_2$ for use in the present invention:

(a) 2588.4 g of a commercially available material (Union Carbide Corporation) containing mixed $V_2C$+VC, sized 65 mesh and finer having the following analysis:

(b) 428.5 g Acheson* brand G39 graphite powder, sized 200 mesh and finer.

* Trademark of Union Carbide Corporation (c) 150 g cobalt powder, extra fine grade from African Metals Corp.

(d) 821.4 g of UCAR* tungsten metal powder (2 micron).

(e) 1306.7 g of Elchrome* metal powder sized 100 mesh and finer.

* Trademark of Union Carbide Corporation

The powders were placed in a one cubic foot ball mill with 75 lbs. of ½-in. dia. balls and turned at 57 RPM for 18 hours. After 18 hours milling, the material was pressed into pellets in a 2 inch diameter die at a fifty ton load. The pellets were crushed into granules. The granules were placed in graphite boats and sintered in a pure hydrogen push-through molybdenum-wound heat-treating furnace. The sintering cycle was as follows: The graphite boat was placed inside the furnace door for ¼ hour, to diffuse out residual atmospheric gases. The boat then was advanced to a 900°–1200° C. zone to allow the reduction of any residual oxides and the removal of the reduction products. The boat was advanced into the hot zone at 1500° C. for 1½ hr. to provide sintering of the cold pressed material. The boat was then pushed out of the hot zone into a water-cooled chamber and brought to room temperature in about 15 minutes. The granules were lightly bonded together but were easily separated in a jaw crusher. Aside from the contained cobalt the material was formed of chemically combined chromium, vanadium, tungsten and carbon in accordance with the present invention and had the following analysis:

| | |
|---|---|
| V - 40.20% | Co - 4.80% |
| W - 15.15% | 0 - 0.02% |
| Cr - 24.06% | N - 0.10% |
| T.C. - 13.03% | Fe - 3.24% |

The wear rate of the deposits for material in accordance with the present invention is at least as good as that of cast tungsten carbide and superior to the vanadium, tungsten carbon material tested which did not contain chromium carbide.

A further advantage is the high toughness of the deposit provided by the material in accordance with the present invention.

What is claimed is:

1. In a method for hard facing a surface of an iron base alloy substrate by forming a bond between said surface and a hard-facing material, the improvement which comprises employing as the hard-facing material a composition which consists essentially of chemically combined vanadium, tungsten and carbon in weight proportions of 0.75 VC, 0.25 WC and about 5% to 40% by weight of chromium carbide admixed therewith, from 0 to 100% of said chromium carbide being chemically combined with said chemically combined vanadium, tungsten and carbon in the form of a vanadium, tungsten, chromium carbide having the empirical formula:

$$[A\ Cr_{1.5}\ B\ 0.75V,\ 0.25W]C$$

where $A = 0.05$ to $0.4$ $B = 0.6$ to $0.95$ $A + B = 1.0$ and up to 15% by weight in the aggregate of cobalt, iron, molybdenum and nickel.

2. A method in accordance with claim 1 wherein said hard facing composition is a sintered solid material in particulated form.

3. A method in accordance with claim 1 wherein said composition contains about 3 to 5% cobalt.

* * * * *

UNITED STATES PATENT AND TRADEMARK OFFICE
CERTIFICATE OF CORRECTION

PATENT NO. : 4,224,382
DATED : September 23, 1980
INVENTOR(S) : Harry J. Brown et al.

It is certified that error appears in the above—identified patent and that said Letters Patent is hereby corrected as shown below:

Column 1, line 49, "abrasio" should read -- abrasion --.

Column 1, line 58, between "carbon" and "weight" the word "in" should be deleted.

Column 1, line 59, the numeral "0.76" should read -- 0.75 --.

Column 3, line 24, the second "the" should be deleted after "The".

Signed and Sealed this

Nineteenth Day of May 1981

[SEAL]

Attest:

RENE D. TEGTMEYER

Attesting Officer

Acting Commissioner of Patents and Trademarks